UNITED STATES PATENT OFFICE.

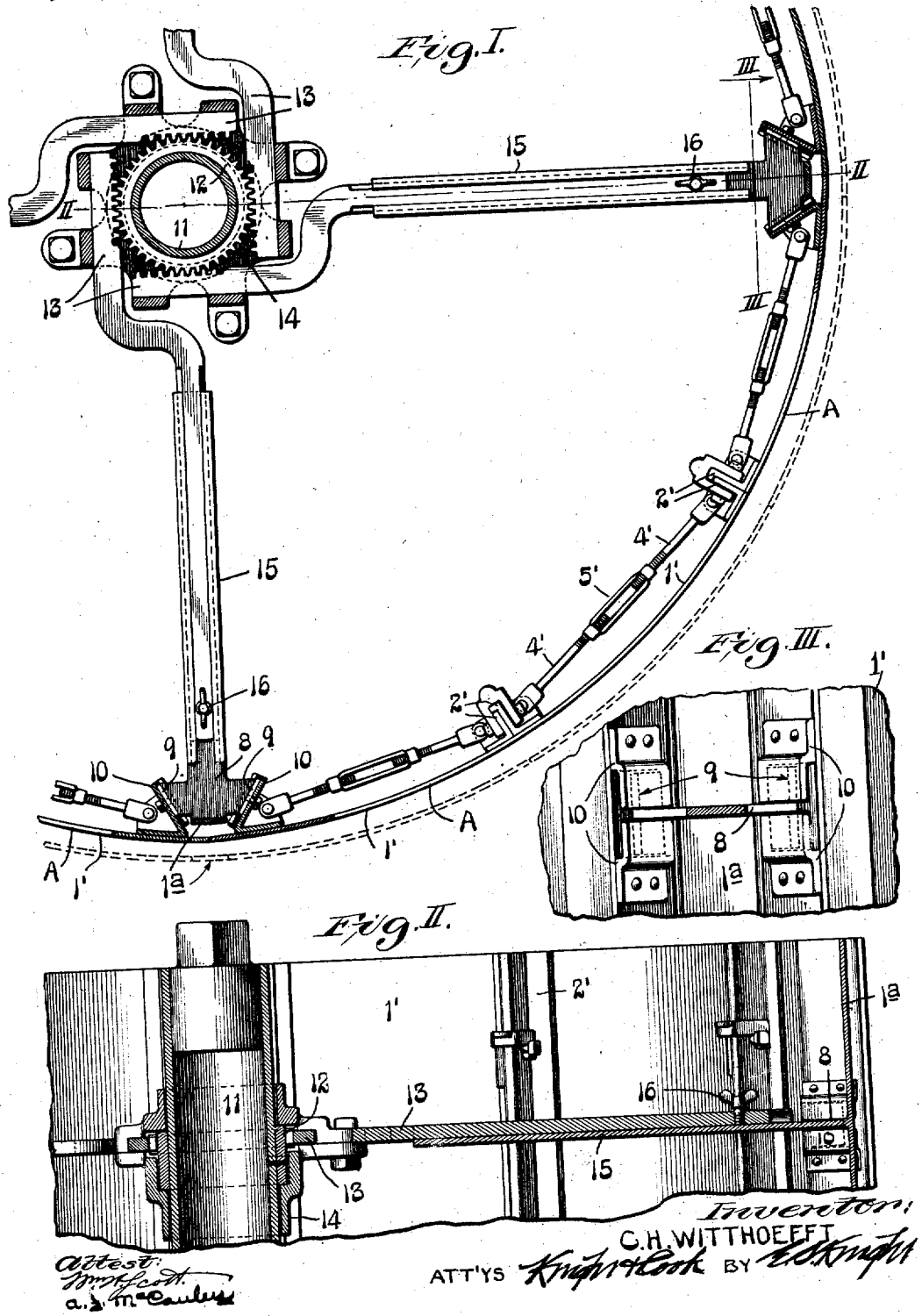

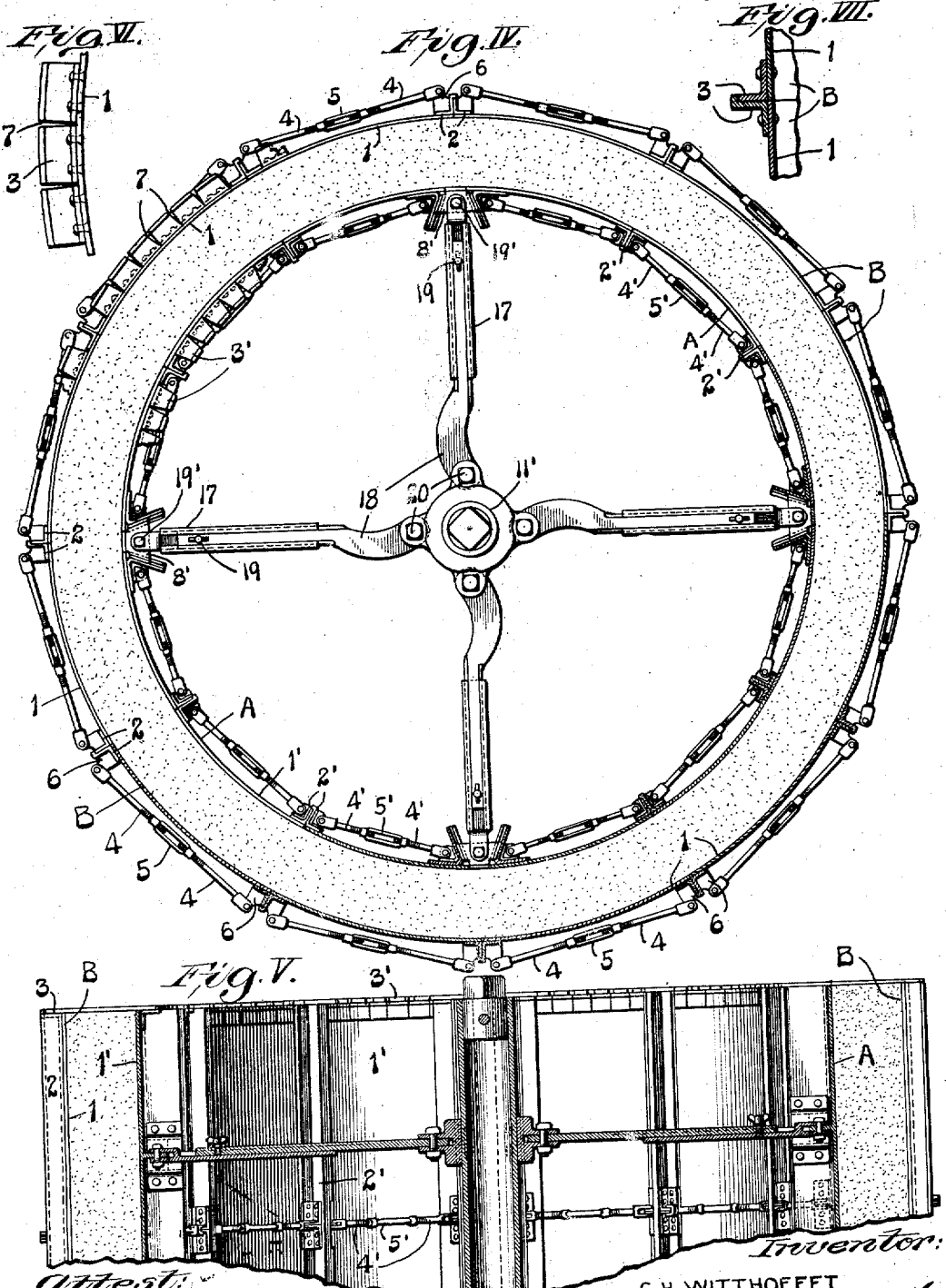

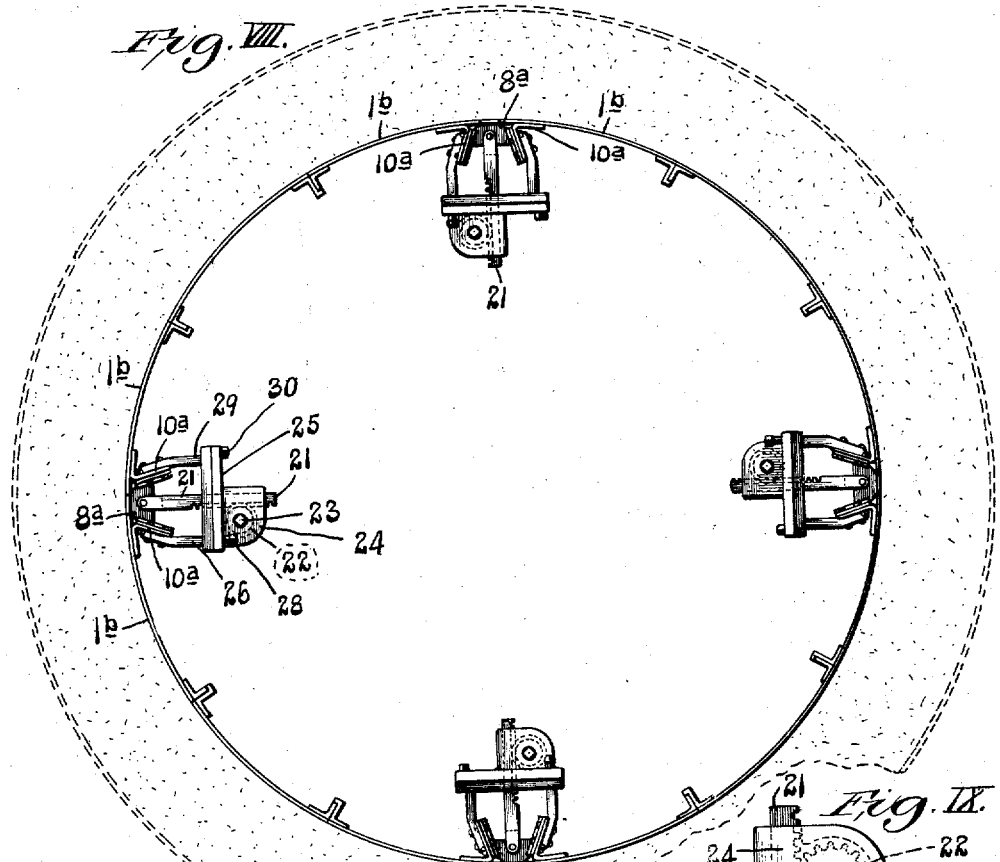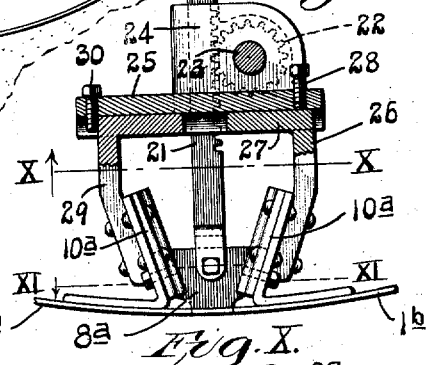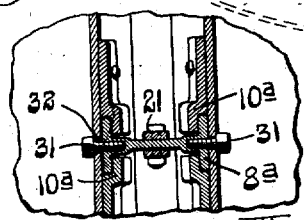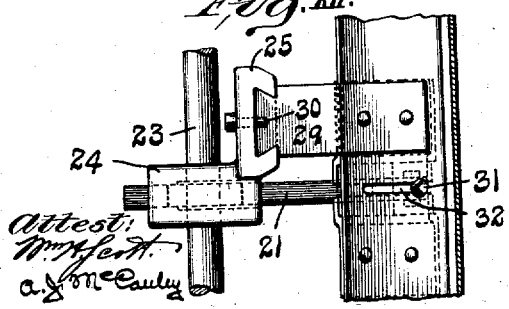

CHARLES H. WITTHOEFFT, OF ST. LOUIS, MISSOURI, ASSIGNOR TO WITTHOEFFT COLLAPSIBLE CONCRETE FORMS COMPANY, OF ST. LOUIS, MISSOURI, A CORPORATION.

MOLD FOR MAKING CONCRETE CHIMNEYS.

1,020,005.

Specification of Letters Patent. Patented Mar. 12, 1912.

Application filed November 17, 1910. Serial No. 592,792.

*To all whom it may concern:*

Be it known that I, CHARLES H. WITTHOEFFT, a citizen of the United States of America, residing at St. Louis, in the State of Missouri, have invented certain new and useful Improvements in Molds for Making Concrete Chimneys, of which the following is a full, clear, and exact description, reference being had to the accompanying drawings, forming a part of this specification.

My invention relates to a mold for use in making concrete chimneys or hollow shafts of concrete, and it has for its object the construction of a mold of this kind comprising mold sections and means whereby said mold sections may be quickly and properly mounted and adjusted to perform their offices.

Figure I is a view of my mold partly in plan and partly in horizontal section, the outer wall of the mold being omitted. Fig. II is a vertical section on line II—II, Fig. I. Fig. III is in part an elevation of one of the mold plate spreading devices, and in part a cross section on line III—III, Fig. I. Fig. IV is a view of my mold including both its inner and outer walls, the mold members being in part in plan and in part in horizontal section, and with a modified form of spreader operating device. Fig. V is a vertical cross section of the mold as shown in Fig. IV. Fig. VI is a fragmentary top view of one of the mold walls and the ledges for the support of a surmounting mold section. Fig. VII is a vertical section through the joint of two mold walls in a tier. Fig. VIII is a top or plan view of a modification. Fig. IX is an enlarged view partly in plan and partly in horizontal section of one of the spreader devices shown in Fig. VIII. Fig. X is a cross section taken on line X—X, Fig. IX. Fig. XI is a cross section taken on line XI—XI, Fig. IX. Fig. XII is an enlarged side elevation of one of the spreader devices shown in Fig. VIII.

In the accompanying drawings: A designates the inner mold sections and B designates the outer mold sections of my chimney or hollow shaft molding apparatus. Each of the outer mold sections comprises (Fig. IV) a mold plate 1 having reinforcing angles 2 at its side edges, and notched angle bars 3 at its top and bottom edges. Each of the angles 2 is fitted to a similar angle on an adjacent mold section and may be removably secured thereto in any suitable manner. Rods 4, connected by turnbuckles 5, are mounted on each outer mold section B, said rods being pivotally connected to brackets 6 at the side edges of the mold section. By operating the turnbuckles 5, the rods 4 may be adjusted, with the result of bending the mold plates 1, the object of such adjustment being to vary the radius of the curved mold plates, allowing them to be used for molding chimneys or hollow shafts of different dimensions. For example, a hollow shaft larger in diameter than the shaft shown in Fig. IV may be molded by adding one or more sections to the structure shown and moving the rods 4 toward each other, through the medium of the turnbuckles 5 by which they are connected. The angle bars 3, at the top and bottom edges of the mold plate 1, are notched at 7 to permit this adjustment.

A single circular series of sections B may be used to form a complete outer mold, but I prefer to make these sections in short lengths and utilize two or more circular series of sections arranged one above the other. The angle bars 3 at the top of the sections may be fitted to similar members on the next adjacent section, as seen in Fig. VII, and these angle bars may be suitably secured together.

The inner mold sections comprise mold plates 1', having reinforcing angles 2' at their side edges and notched angle bars 3' at their top and bottom edges. Rods 4' are pivoted to each plate 1' adjacent its side edges, said rods being connected by turnbuckles 5'. These rods and turnbuckles constitute a substantially circular row of bending devices whereby the various mold plates may be bent to form circular molds of different diameters. All of the parts just described are very similar to like parts in the outer mold sections B and therefore further description of them is deemed unnecessary.

The inner mold (see Figs. I to III) is adapted to be expanded or contracted by the operation of wedges 8 provided with a web having inclined flanges 9 which are interlocked with and slidably mounted in correspondingly inclined guides 10, the latter being secured to plates of the main mold sections A. The wedges 8 are preferably H shaped in cross section (see Fig. III). The flanged wedges 8 serve as means for connecting adjacent mold plates and these wedges may be operated to shift the mold plates from the positions seen in full lines in Fig. I to the expanded or operative position shown in dotted lines. When the mold is expanded, the edges of adjacent mold plates 1' are spaced away from each other and the wedges therefore carry auxiliary mold plates 1ª which fill the space between mold plates 1' when the mold is in position for utility. During the operation of contracting the mold, the wedges are actuated to move the main mold plates toward each other and simultaneously withdraw the narrow mold plates 1ª from the space between said main mold plates.

The means for operating the wedges 8 comprises a rotatable shaft 11 to which a suitable number of pinions 12 are rigidly secured. Rack bars 13 meshing with the pinions 12 are mounted in guide blocks 14 and adjustably connected to the wedges 8. The rack bars 13 are interlocked with and are slidably fitted to arms 15, fixed to the webs of the wedges.

16 designates set screws for clamping the rack bars to wedge bars 15. The object in adjustably connecting the rack bars to the wedges is to enable the expanding apparatus to be used in chimneys or shafts of different diameters.

In Fig. IV I have shown wedges 8' which have the same function as the wedges 8. The wedges 8' are adjustably connected to an operating shaft 11' by bars 17 and 18. Set screws 19 connect the bars 17 and 18. The bars 17 are pivoted at 19' to the wedges 8' and the bars 18 are pivoted at 20 to the operating shaft 11'. Rotating the shaft 11' will move the wedges 8' and thereby expand or contract the inner mold.

The expanding apparatus shown in Figs. VIII to XII comprises wedges 8ª slidingly mounted in guides 10ª carried by mold sections 1ᵇ. Rack bars 21, pivoted to the wedges 8ª, mesh with pinions 22 to which operating shafts 23 are secured. The pinions and rack bars are arranged in housings 24, each of these housings being secured to a guide block 25.

26 designates an arm rigidly connected to a guide 10ª and having a lug 27 at its outer end. The lug 27 is adjustably mounted in the guide block 25 and clamped thereto by a set screw 28. An arm 29, opposing the arm 26, is secured to a guide 10ª and slidably mounted in the guide block 25, the sliding movement of the arm 29 being limited by a screw 30, (Figs. IX and XII).

When a pinion 22 is operated to withdraw a wedge 8ª, the arm 29 slides toward the arm 26 and the adjacent mold plates therefore move toward each other.

To prevent the wedges 8ª from being accidentally moved out of the guides 10ª, screws 31, secured to the guides, are arranged in slots 32 in the guides.

I claim:—

A mold of the character described, comprising main mold plates provided with guideways, a wedge interposed between said guideways, said wedge comprising a web having two pairs of flanges which extend into said guideways, said wedge being H shaped in cross section, a narrow mold plate fixed to the web of said wedge and adapted to occupy a position between the main mold plates, an arm fixed to the web of said wedge, and means for operating said arm to slide the wedge in said guideways, thereby withdrawing said narrow mold plate from the space between the main mold plates and simultaneously moving said main mold plates toward each other.

CHAS. H. WITTHOEFFT.

In the presence of—
A. J. McCauley,
E. B. Linn.